United States Patent [19]

Moran

[11] 4,113,798

[45] Sep. 12, 1978

[54] TRANSPARENT ABS POLYBLENDS

[75] Inventor: James R. Moran, Hampden, Mass.

[73] Assignee: Monsanto Company, St. Louis, Mo.

[21] Appl. No.: 612,614

[22] Filed: Sep. 11, 1975

[51] Int. Cl.² .............................................. C08L 55/02
[52] U.S. Cl. ................................................. 260/876 R
[58] Field of Search .................................... 260/876 R

[56] References Cited

U.S. PATENT DOCUMENTS

| | | | |
|---|---|---|---|
| 3,524,536 | 8/1970 | Terenzi et al. | 260/876 R X |
| 3,792,125 | 2/1974 | Wefer | 260/876 R |
| 3,793,403 | 2/1974 | Dalton et al. | 260/876 R |
| 3,830,889 | 8/1974 | Deets et al. | 260/876 R |
| 3,851,014 | 11/1974 | Dalton | 260/876 R |
| 3,900,529 | 8/1975 | Beer | 260/876 R |
| 3,914,337 | 10/1975 | Giddings et al. | 260/876 R |
| 3,939,223 | 2/1976 | Powell et al. | 260/876 R |

FOREIGN PATENT DOCUMENTS 702,737  1/1965  Canada ................................. 260/876 R Primary Examiner—Carman J. Seccuro
Attorney, Agent, or Firm—Joseph S. Nelson; William J. Farrington; James C. Logomasini

[57] ABSTRACT

The polyblend comprises a matrix terpolymer of monovinylidene aromatic, ethylenically unsaturated nitrile and acrylate monomers blended with a graft copolymer having superstrate polymers of monovinylidene aromatic and ethylenically unsaturated monomers on a substrate of a diene rubber.

12 Claims, No Drawings

TRANSPARENT ABS POLYBLENDS

BACKGROUND OF THE INVENTION

Polyblends are known in the art as tough engineering plastics having high modulus and great utility for fabricated parts for appliances and automotive parts. ABS polyblends generally comprise a rigid matrix copolymer phase of styrene and acrylonitrile monomers having dispersed therein a graft copolymer of a diene rubber substrate grafted with the styrene/acrylonitrile copolymer. It is known that the graft copolymer is incompatible with the matrix phase and has a different refractive index, hence, the polyblend has a high level of haze providing opaque and translucent polyblends which are generally pigmented as fabricated parts.

There has now been developed a great need for highly transparent polyblends that can be fabricated into transparent parts yet provide the same high level of toughness and modulus typical of ABS polyblends.

The prior art discloses several transparent graft copolymer systems but not for the ABS polyblend types. The transparent graft copolymers disclosed by U.S. Pat. Nos. 2,857,360, 3,177,268, 3,644,584, 3,586,737, 3,670,052 and 3,775,518 teach graft copolymer systems using diene rubber substrate grafted with high levels of acrylate and/or nitrile monomers to provide a graft copolymer with a superstrate refractive index closer to the low refractive index of the diene rubber substrate, hence, providing a transparent graft copolymer for blending with polyvinyl chloride polymethyl methacrylate providing transparent polyblends.

It has now been discovered that diene rubber substrates grafted with styrene/acrylonitrile copolymer superstrates only can be blended with particular matrix styrene terpolymers to provide transparent polyblends having the toughness and modulus of ABS polyblends.

SUMMARY OF THE INVENTION

It has now been discovered that transparent ABS polyblends can be obtained in a composition comprising a polyblend of:

A. from about 50 to 90 percent by weight of a matrix terpolymer comprising from about 35 to 60 percent by weight of an monovinylidene aromatic monomer, from about 15 to 25 percent by weight of a ethylenically unsaturated nitrile monomer and from about 20 to 45 percent by weight of an acrylate monomer selected from the group consisting of alkyl acrylate and alkyl alkacrylate monomers, and from 10 to 30 percent by weight of, B. a graft copolymer having a graftable rubber substrate containing a diene rubber forming monomer and a superstrate of a copolymer comprising a monovinylidene aromatic monomer and an ethylenically unsaturated nitrile monomer, said graft copolymer having an average clustered particle size diameter of 0.10 to 0.70 microns and a superstrate to substrate ratio of 20 to 60:100, said superstrate copolymer comprising at least about 70 percent by weight monovinylidene aromatic monomer and from about 10 to 30 percent by weight of ethylenically unsaturated nitrile monomer, said rubber substrate comprising at least about 70 percent by weight of a conjugated diene monomer and from about 0-30 percent by weight of a monovinylidene aromatic monomer, said graft copolymer being dispersed in said matrix terpolymer.

DESCRIPTION OF THE PREFERRED EMBODIMENTS

The Terpolymers

The terpolymers are styreneic terpolymers having a greatest portion of monovinylidene aromatic monomer in their compositions. Such styreneic monomers found useful in the terpolymers are styrene; alphaalkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring substituted halo-styrene, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methyl-styrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed. Ethylenically unsaturated nitrile monomers are used as termonomers in small proportions. Such nitrile monomers found useful are acrylonitrile, methacrylonitrile, ethacrylonitrile and mixtures thereof. Acrylates are used as termonomers. Such acrylate termonomers found to be useful are the alkyl acrylate and alkyl alkacrylate monomers, e.g., methyl acrylate, ethyl acrylate, butyl acrylate, methyl methacrylate, ethyl methacrylate, butyl methacrylate and mixtures thereof.

The matrix terpolymers then contain various proportions of the monomers disclosed in polymerized form comprising: from about 35 to 60 percent by weight of the monovinylidene aromatic monomer, preferably from about 40 to 55 percent by weight; from about 15 to 25 percent by weight of ethylenically unsaturated monomer, preferably from about 17 to 23 percent by weight and from about 20 to 45 percent by weight of the acrylate monomer, preferably from about 25 to 40 percent by weight.

The matrix terpolymers can be prepared by the usual polymerization processes, i.e., by mass, suspension or emulsion polymerization. Such processes are well known and will also be described herein in the examples. Generally, emulsion polymerization is used to obtain a terpolymer in emulsion form which can more readily be blended with a graft copolymer latex. However, suspension terpolymers can be used for a portion of the matrix to obtain improved color and clarity of the final polyblend.

The emulsion polymerization utilizes an initial monomer add and a continuous monomer add or late monomer add to insure minimal polymer compositional drift during the reaction. The monomers are fed in amounts to provide about 25–45 percent by weight polymerized terpolymer in a finished aqueous emulsion.

Exemplary of suitable peroxy catalysts are the alkali peroxides, persulfates, perborates, peracetates and percarbonates, and hydrogen peroxide. If so desired, the catalysts may be activated to form redox systems. In addition, it may be advantageous to include an oil-soluble catalyst such as di-tert-butyl peroxide, benzoyl peroxide, lauroyl peroxide, oleyl peroxide, toluyl peroxide, di-tert-butyl diperphthalate, tert-butyl peracetate, tert-butyl perbenzoate dicumyl peroxide, tert-butyl peroxide, isopropyl peroxy dicarbonate, 2,5-dimethyl-2,5-di(- tert-butylperoxy) hexane, 2,5-dimethyl-2,5-di(tert-butylperoxy) hexyne-3-tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethylhexane-2,5-di-hydroperoxide, etc., and mixtures thereof. However, other free-radical generating catalysts may be employed such as actinic radiation.

Claim transfer agents and other polymerization modifiers may be desirably included and it is generally advantageous to incorporate a higher alkyl mercaptan, e.g., dodecyl mercaptan or a terpene such as terpinolene. Generally, modifiers are added in amounts of from 0.01 to 1.0 part per hundred of monomer, preferably in amounts of from about 0.1 to 0.35 pph of monomer.

The emulsion mixture is then polymerized in an inert atmosphere at temperatures in the range of 20° to 100° C with agitation. Pressures of 1 to 100 pounds per square inch may be employed and the monomers and/or additional catalyst may be added incrementally or continuously over a portion of the reaction cycle. Polymerization is contained until substantially all, i.e., more than 90 percent, of the monomers have reacted. The remaining monomers and other volatile components are then distilled from the latex, which is then dewatered, washed and dried or blended with the graft copolymer latex prior to dewatering, washing and drying as a polyblend.

Terpolymers of higher clarity and lower color can be prepared by suspension polymerization by conventional procedures as shown in Example 4. The monomers are suspended in aqueous catalyzed systems, charging proportional amounts of the monovinylidene aromatic ethylenically unsaturated nitrile and acrylate monomers desired in the terpolymer, said terpolymer as in emulsion polymerization, suspension polymerization uses continuous or late adds of the monomers to adjust the proportions of the monomers in the terpolymer if the rates of polymerization of the individual monomers are sufficiently different to shift the monomer composition ratios desired in the terpolymer. As shown in Example 4, the major portion of the styrene monomer, which polymerizes more rapidly than the other two monomers, is added continuously during the polymerization to insure terpolymer uniformity as to composition. Such suspension processes are described in the publication of C. E. Schildknecht, "Polymer Processes", Interscience Publishers, New York, N. Y., 1956.

The Rubber Substrate

The preferred rubbers are diene rubbers or mixtures of diene rubbers, i.e., any rubbery polymers (a polymer having a second order transition temperature not higher than 0° C, preferably not higher than −20° C, as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene, an aralkylstyrene, such as the o-, m-, and p-methyl-styrenes, 2,4-dimethylstyrene, the ar-ethylstyrenes, p-tert-butyl-styrene, etc.; an alpha-alkylstyrene, such as alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics. The crosslinking agent can be any of the agents conventionally employed for crosslinking diene rubbers, e.g., divinylbenzene, diallyl maleate, diallyl fumarate, diallyl adipate, allyl acrylate, allyl methacrylate diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Of the various techniques customarily employed for polymerizing rubber monomers including mass, suspension and emulsion polymerization, emulsion polymerization is preferred since it will provide the particle size for which the present invention is most beneficially employed and may be used to produce a latex which is useful as the base for emulsion polymerization of the graft copolymer.

GRAFT COPOLYMERIZATION PROCESS

The graft copolymers are prepared by polymerizing monovinylidene aromatic monomers and the ethylenically unsaturated nitrile monomers in the presence of the preformed rubber substrate, generally in accordance with conventional graft polymerization techniques. Although suspension and mass polymerization techniques may be employed, the preferred processes use an emulsion technique to obtain the particle size of not more than about 0.7 micron for the graft copolymer with which the present invention is most beneficially employed. In such graft polymerization, the preformed rubber substrate is contained in a latex with dispersed monomers and this admixture is polymerized to combine chemically or graft at least a portion of the interpolymer upon the rubber substrate. Depending upon the ratio of monomers to rubber substrate and polymerization conditions, it is possible to produce the desired degree of grafting of the copolymer onto the rubber substrate. The grafting mixed comonomers are grafted to the substrate in a ratio of monovinylidene aromatic monomers to ethylenically unsaturated monomers of about 70:30, preferably 80:20 providing, e.g. styrene/acrylonitrile graft copolymers having from about 70 to 80 weight percent of styrene and 20 to 30 weight percent of acrylonitrile.

As will be pointed out, more in detail hereinafter, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., may also exert an effect.

The catalyst is generally included within the range of 0.001 to 1.0 percent by weight, and preferably on the order of 0.05 to 0.08 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 2.5 percent by weight of the polymerizable material. In addition, it may be desirable to include relatively small amounts of antioxidants or stabilizers such as the conventional alkylated phenols, although these may be added during or after polymerization.

In the emulsion polymerization process, the monomers and rubber substrate are emulsified in water by use of suitable emulsifying agents such as fatty acid soaps, alkali metal or ammonium soaps of higher molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 0.1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, water, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and azo catalysts, and the resultant latex may be used as the aqueous medium with which the copolymer monomers are admixed. In this manner, the catalyst for the rubber polymerization may function in whole or in part as the catalyst for the graft polmerization. However, additional catalyst may be added at the time of graft polymerization. Suitable peroxy catalysts have been disclosed hereinbefore and may be used in graft copolymerization process.

Chain transfer agents and other polymerization modifiers may be desirably included and it is generally advantageous to incorporate a higher alkyl mercaptan such as tert-dedecyl mercaptan, which acts both as a promoter and a regulator. In addition, antioxidants and stabilizers such as the alkylated phenols may be added.

The emulsion mixture is then polymerized in an inert atmosphere at temperatures in the range of 20° to 100° C with agitation. Pressures of 1 to 100 pounds per square inch may be employed and the monomers and/or additional catalyst may be added incrementally or continuously over a portion of the reaction cycle. Polymerization is continued until substantially all, i.e., more than 90 percent, of the monomers have reacted. The remaining monomers and other volatile components are then distilled from the latex, which is then dewatered, washed and dried.

The base particle size of the emulsion graft particles may be varied by seeding, emulsifying agent concentration, agitation, rubber size variation through agglomeration prior to grafting, coagulation techniques, etc. One of the most advantageous means for achieving the desired particle size rubber substrate is by controlled agglomeration using acidulation techniques as taught in U.S. Pat. No. 3,551,370 to W. O. Dalton.

Effect of Particle Size

Generally, the particle size of the rubber in the emulsion during the graft polymerization reactions has an effect upon the optimum grafting level for the graft copolymer. As will be readily appreciated, a given weight percentage of smaller size rubber particles will provide considerably greater surface area for grafting than the equivalent weight of a larger size rubber particle. Accordingly, the density of grafting will be varied depending upon the size of the rubber particle. Generally, the smaller rubber particles will tolerate a higher superstrate/substrate ratio than the larger size particles to give generally comparable results.

The weight of superstrate is determined for 100 grams of the graft copolymer by solvent extracting the ungrafted matrix from a polymerization blend and subtracting the weight of rubber charge.

The particle size of the rubber graft copolymer in the polyblend also has a significant effect upon the gloss and transparency properties; i.e., increasing the particle size of the graft copolymer tends to adversely affect these properties. Moreover, if the particles are in excess of about 0.7 micron, the benefits of the present invention are materially reduced. Accordingly, the particle size of the graft copolymers may be varied from as little as 0.03 micron to as much as about 0.7 micron, depending upon the ultimate properties of the composition. However, the preferred latices utilize rubbers having a particle size of about 0.05 to 0.5 micron, and desirably 0.08 to 0.3.

The particle size is a weight average particle size diameter expressed in microns. The weight average particle size is measured with a photosedimentometer by the published procedure of Graves, M. J. et al., "Size Analysis of Subsieve Powders Using a Centrifugal Photosedimentometer", British Chemical Engineering 9:742-744 (1964). A Model 3000 Particle Size Analyzer from Martin Sweets Company, 3131 W. Market St., Louisville, Ky. was used.

Although the amount of copolymer superstrate grafted onto the rubber substrate may vary from as little as 10 parts by weight per 100 parts of substrate to as much as 250 parts per 100 parts, the preferred graft copolymers have a superstrate-substrate ratio of about 20 to 100:100 most preferably 30 to 60:100. The copolymer grafted has a ratio of monovinylidene aromatic monomer to ethylenically unsaturated monomer, e.g., styrene to acrylonitrile of from about 70 to 30, most preferable 75 to 25 and most preferably from about 80 to 20.

Polyblends

The graft copolymers may be blended with the ungrafted matrix terpolymers as latices followed by coagulation, washing and drying. The dried latex blend may be further dry blended with the suspension matrix terpolymer and colloided by extrusion, milling or by banbury dispersing the graft copolymer in the matrix copolymer to form the polyblend. Such blending processes are well known in the art.

During the formation of the polyblend, under melt colloiding conditions at about 232° C., the grafted copolymers have been found to cluster providing stable clustered particles that are stable to the shear of extrusion and molding operations. The clustered particles have a weight average particle size diameter of from about 0.10 to 0.7 microns, preferably from about 0.3 to 0.6 microns in their clustered state providing transparency and desirable toughness and gloss properties for the polyblend.

Generally, the blends will contain from about 1 to 70 parts by weight of the graft copolymer preferable 5 to 40 percent by weight, most preferably from about 10 to 30 percent by weight. Such proportions of graft copolymer provide the polyblend with from about 5 to 20 percent by weight of the diene rubber moiety, preferably 10 to 15 percent, providing toughening for the polyblend.

The following examples are presented as illustrations of the preparation and utility of the present ABS compositions providing transparent polyblends. The examples are not intended in any way to limit the spirit and scope of the invention.

EXAMPLE 1

Graft Copolymer Preparation

A graft copolymer latex was prepared utilizing a butadiene/styrene rubber substrate (90:10). To a latex containing 100.0 parts of rubber and about 6.0 parts soap, 200 parts of water and 0.2 part potassium persulfate was added 50.0 parts of a mixture of styrene and acrylonitrile monomers (80:20

Terpolymer Preparation over a period of about 1½hours. During the polymerization cycle, the temperature ranged from 50° to 70° C. and the pressure ranged from 0 to 15 p.s.i.g. After polymerization had been completed, the graft copolymer was found to have a superstrate to substrate ratio of about 50:100 and to have a particle size of about 0.05 micron. The emulsion had about 43 percent graft copolymer solids and about 67 percent rubber.

EXAMPLE 2

Example 1 was repeated charging about 45 parts by weight of a mixture of styrene/acrylonitrile monomer (80:20) providing a graft copolymer providing a superstrate to substrate ratio of 45:100. The emulsion has about 42 percent graft copolymer solids and about 69 percent rubber.

EXAMPLE 3

About 1991 grams of water was charged to ta stirred autoclave reactor along with 25 gms. of Rubber Reserve Soap. At catalyst solution of 320 gms. of water and 6.25 grams of $K_2S_2O_8$ was prepared. A monomer mixture of styrene, acrylonitrile and methmethacrylate was prepared with ratio of S/AN/MMA of 65/80/105 gms. respectively of the three monomers. The monomer mixture and 110 grams of the catalyst solution were fed to the emulsion on an initial add and polymerization carried out at 78° C. A second monomer mixture of the three monomers was prepared having a monomer ratio of S/AN/MMA of 460/200/340 grams respectively. The second monomer mixture was added continuously (60 cc/10 min.) over a period of 3 hours. A final add of styrene monomer (100 gms.) was made over 15 minutes and the reaction carried to completion over a period of 1 hour. The emulsion was found to have about 35 percent by weight of matrix terpolymer having a S/AN/MMA monomer ratio of about 46/20/34.

EXAMPLE 4

The terpolymer of Example 3 was reproduced using suspension polymerization and a suspending agent (interpolymer of 95.0 mole percent of acrylic acid and 4.5 mole percent of 2 ethylhexylacrylate having a specific viscosity of about 4.0 as determined on a 1.0 percent solution in water at 25° C.) About 540 grams of water containing about 1.9 gms. of terpinoline (0.3 pphm.), about 0.44 grams of tertiary butyl peroxide (0.063 pphm.) was charged to a stirred autoclave along with 86 grams styrene, 120 grams of acrylonitrile and 175 grams methyl methacrylate. The reaction ws heated to 125° C. for 90 minutes, followed by a transition of 125° C–150° C. for 60 minutes and an additional 90 minutes at 150° C. A late monomer add containing 166 grams sytrene and 53 grams methyl methacrylate was added continuously over 3 hours starting at zero hours plus 30 minutes. The suspending agent (0.05 pphm. as 15 cc. of 2 percent solution) was added at zero hours plus 2 hours. After 4 hours traces of residual monomer were steam distilled off and the suspension terpolymer was filtered off, washed and dried givng a terpolymer having a S/AN/MMA ratio of about 46/20/34 respectively.

EXAMPLE 5

The emulsion of Example 2 (116 parts) was mixed with the emulsion of Example 3 (163 parts) and coagulated with $MgSO_4$, washed and dried giving a dry polyblend containing about 35 percent rubber. About 100 parts of the dry polyblend was further mixed with the suspension terpolymer (140 parts) of Example 4 providing a dry blend having about 13 percent rubber. The dry blend was melt colloided by extrusion at a stock temperature of about 450° F., or 232° C. The polyblend was then molded at 232° C., into 3 × 4 × 0.1 inch chips for color and haze values and ½ × ½Izod bars for impact tests (ASTM D-256-56). The test data is shown in Table 1.

TABLE 1

| Sample | Izod Impact[1] (ft.lb. in.) | Tensile[2] Yield (psi) | Tensile[3] Modulus (psi) | Haze | Color |
|---|---|---|---|---|---|
| A | 2.0 | 5660 | 3.4 | 13 | 28 |
| B | 1.8 | 6900 | 3.8 | 100 | |

A Sample for Example 4
B Sample of an ABS polyblend having about 13 percent of a diene rubber formed by blending the graft copolymer of Example 1 with a matrix phase copolymer having a styrene/acrylonitrile ratio of 74/26
[1]ASTM D-256-56
[2]ASTM D-638-68
[3]ASTM D-638-68

EXAMPLE 6

A graft copolymer latex was prepared utilizing a butadiene/styrene rubber substrate 70:30. To a latex containing 100.0 parts of rubber and about 6.0 parts soap, 200 parts of water and 0.2 part potassium persulfate was added 50.0 parts of a mixture of styrene and acrylonitrile monomrs (80:20) over a period of about 1½ hours. During the polymerization cycle, the temperature ranged from 50° to 70° C. and the pressure ranged from 0 to 15 p.s.i.g. After polymerization had been completed, the graft copolymer was found to have a superstrate to substrate ratio of about 50:100 and to have a particle size of about 0.05 micron. The emulsion had about 43 percent graft copolymer solids and about 67 percent rubber.

Example 7

About 1991 grams of water was charged to a stirred autoclave reactor along with 25 gms. of Rubber Reserve Soap. At catalyst solution of 320 gms. of water and 6.25 grams of $K_2S_2O_8$ was prepared. A monomer mixture of styrene, acrylonitrile and methyl methacrylate was prepared with ratio of S/AN/MMA of 79/63/33 gms. respectively of the three monomers. The monomer mixture and 110 gms. of the catalyst solution were fed to the emulsion on an initial add and polymerization carried out at 78° C. A second monomer mixture of the three monomers was prepared having a monomer ratio of S/AN/MMA of 510/200/260 grams respectively. The second monomer mixture was added continuously (60 cc/10 min.) over a period of 3 hours. A final add of styrene monomer (25 gms.) was made over 15 minutes and the reaction carried to completion over a period of 1 hour. The emulsion was found to have about 35 percent by weight of matrix terpolymer having a S/AN/MMA monomer ratio of about 52/21/27.

EXAMPLE 8

The terpolymer of Example 7 was reproduced using suspension polymerization and a suspending agent (interpolymer of 95.0 mole percent of acrylic acid and 4.5 mole percent of 2 ethylhexylacrylate having a specific viscosity of about 4.0 as determined on a 1.0 percent solution in water at 25° C.). About 540 grams of water containing about 1.9 gm. of terpinoline (0.3 pphm.), about 0.44 gram of tertiary butyl peroxide (0.063 pphm) was charged to a stirred autoclave along with 132 grams styrene, 107 grams of acrylonitrile and 141 grams methyl methacrylate. The reaction was heated to 125° C. for 90 minutes, followed by a transition of 125° C.-150° C. for 60 minutes and an additional 90 minutes at 150° C. A late monomer add containing 180 grams styrene, 19 gms. acrylonitrile and 21 grams methyl methacrylate was added continuously over 3 hours starting at zero hours plus 30 minutes. The suspending agent (0.05 pphm at 15 cc. of 2 percent solution) was added at zero hours plus 2 hours. After 4 hours traces of residual monomer were steam distilled off and the suspension terpolymer was filtered off, washed and dried giving a terpolymer having a S/AN/MMA ratio of about 52/21/27 respectively.

EXAMPLE 9

Polyblend Formation

The emulsion of Example 6 (116 parts) was mixed with the emulsion of Example 7 (163 parts) and coagulated with $MgSO_4$, washed and dried giving a dry polyblend containing about 35 percent rubber. About 100 parts of the dry polyblend was further mixed with the suspension terpolymer of Example 8 (140 parts) providing a dry blend having about 13 percent rubber. The dry blend was melt colloided by extrusion at a stock temperature of about 450° F., or 232° C. The polyblend was then molded at 232° C., into 3 × 4 × 0.1 inch chips for color and haze values and ½ × ½ inch Izod bars for impact tests (ASTM D-256-56). The test data is shown in Table 2.

TABLE 2

| Sample | Izod Impact[1] (ft.lb. in.) | Tensile[2] Yield (psi) | Tensile[3] Modulus (psi) | Haze[4] | Color[5] |
|---|---|---|---|---|---|
| A | 2.0 | 5660 | 3.4 | 13 | 28 |
| B | 1.8 | 6900 | 3.8 | 100 | |

A Sample for Example 9
B Sample of an ABS polyblend having about 13 percent of a diene rubber formed by blending the graft copolymer of Example 1 with a matrix phase copolymer having a styrene/acrylonitrile ratio of 74/26
[1]ASTM D-256-56
[2]ASTM D-638-68
[3]ASTM D-638-68
[4]ASTM D-1003-66 (Sample 0.100" thickness)
[5]Color - J-B Color
The J-B or 580–420 mμ filter transmittance readings on a GE spectrophotometer provides an instrumental method for determining degree of yellowness of molded chips. The higher the 580 reading, the less blue the sample is, and the higher the 420 reading, the less yellow is the component. Therefore, the higher the difference between 580–420, the more yellow the sample is. J being the 580μ transmittance reading. Samples being 0.100" in thickness.

What is claimed is:
1. An improved transparent polyblend composition of:
   A. from about 50 to 90 percent by weight of a matrix terpolymer comprising from about 35 to 60 percent by weight of an monovinylidene aromatic monomer, from about 15 to 25 percent by weight of a ethylenically unsaturated nitrile monomer and from about 20 to 45 percent by weight of an acrylate monomer selected from the group consisting of alkyl acrylate and alkyl alkacrylate monomers, and from 10 to 30 percent by weight of,
   B. a graft copolymer having a graftable rubber substrate containing a diene rubber forming monomer and a superstrate of a copolymer consisting essentially of a monovinylidene aromatic monomer and an ethylenically unsaturated nitrile monomer, wherein the improvement comprises: said graft copolymer having an average clustered particle size diameter of about 0.3 to 0.6 microns and a superstrate to substrate ratio of 20 to 60:100, said superstrate copolymer comprising at least about 70 percent by weight monovinylidene aromatic monomer and from about 10 to 30 percent by weight of ethylenically unsaturated nitrile monomer, said rubber substrate comprising at least about 70 percent by weight of a conjugated diene monomer and from about 0–30 percent by weight of a monovinylidene aromatic monomer, said graft copolymer being dispersed in said matrix terpolymer as clustered particles providing improved toughness.

2. A composition of claim 1, wherein said monovinylidiene aromatic monomer is styrene and said ethylenically unsaturated nitrile is acrylonitrile.

3. A composition of claim 1, wherein the rubber substrate comprises at least about 90 percent by weight of a 1,3 conjugated diene monomer and from about 1 to 10 percent by weight of a monovinylidene aromatic monomer.

4. A composition of claim 3, wherein said diene monomer is butadiene and said monovinylidene aromatic monomer is styrene.

5. A composition of claim 1, wherein said acrylate monomer is methyl methacrylate.

6. A composition of claim 1, wherein said matrix terpolymer consists essentially of from about 45 to 55 percent by weight styrene, from about 17 to 23 percent by weight acrylonitrile and from about 25 to 40 percent by weight methyl methacrylate, said graft copolymer having a substrate consisting essentially of from about 87 to 93 percent by weight butadiene and from about 7 to 13 percent by weight styrene and a superstrate consisting essentially of from about 77 to 83 percent by weight styrene and from about 17 to 23 percent by weight acrylonitrile wherein said superstrate to substrate ratio is from about 30 to 60:100, said graft copolymer having an average clustered particle size diameter of from about 0.3 to 0.60 microns being dispersed in said matrix terpolymer.

7. An improved process for preparing transparent polyblends wherein:
  A. from about 50 to 90 percent by weight of a matrix terpolymer comprising from about 35 to 60 percent by weight of an monovinylidene aromatic monomer, from about 15 to 25 percent by weight of a ethylenically unsaturated nitrile monomer and from about 20 to 45 percent by weight of an acrylate monomer selected from the group consisting of alkyl acrylate and alkyl alkacrylate monomers is melt blended with about 10 to 30 percent by weight of,
  B. a graft copolymer having a graftable rubber substrate containing a diene rubber forming monomer and a superstrate of a copolymer consisting essentially of a monovinylidene aromatic monomer and an ethylenically unsaturated nitrile monomer, wherein the improvement comprises: blending a graft copolymer having an average clustered particle size diameter of about 0.3 to 0.6 microns and a superstrate to substrate ratio of 20 to 60:100, said superstrate copolymer comprising at least about 70 percent by weight monovinylidene aromatic monomer and from about 10 to 30 percent by weight of ethylenically unsaturated nitrile monomer, said rubber substrate comprising at least about 70 percent by weight of a conjugated diene monomer and from about 0-30 percent by weight of a monovinylidene aromatic monomer, said graft copolymer being dispersed in said matrix terpolymer as clustered particles providing improved toughness.

8. A process of claim 7 wherein said monovinylidene aromatic monomer is styrene and said ethylenically unsaturated nitrile is acrylonitrile.

9. A process of claim 7 wherein the rubber substrate comprises at least about 90 percent by weight of a 1,3 conjugated diene monomer and from about 1 to 10 percent by weight of a monovinylidene aromatic monomer.

10. A process of claim 7 wherein said diene monomer is butadiene and said monovinylidene aromatic monomer is styrene.

11. A process of claim 7 wherein said acrylate monomer is methyl methacrylate.

12. A process of claim 7 wherein said matrix terpolymer consists essentially of from about 45 to 55 percent by weight styrene, from about 17 to 23 percent by weight arcylonitrile and from about 25 to 40 percent by weight methyl methacrylate, said graft copolymer having a substrate consisting essentially of from about 87 to 93 percent by weight butadiene and from about 7 to 13 percent by weight styrene and a superstrate consisting essentially of from about 77 to 83 percent by weight styrene and from about 17 to 23 percent by weight acrylonitrile wherein said superstrate to substrate ratio is from about 30 to 60:100, said graft copolymer having an average clustered particle size diameter of from about 0.3 to 0.60 microns being dispersed in said matrix terpolymer.

* * * * *